United States Patent
Verrilli et al.

(10) Patent No.: US 11,144,368 B2
(45) Date of Patent: Oct. 12, 2021

(54) PROVIDING SELF-RESETTING MULTI-PRODUCER MULTI-CONSUMER SEMAPHORES IN DISTRIBUTED PROCESSOR-BASED SYSTEMS

(71) Applicant: QUALCOMM Incorporated, San Diego, CA (US)

(72) Inventors: Colin Beaton Verrilli, Apex, NC (US); Natarajan Vaidhyanathan, Carrboro, NC (US)

(73) Assignee: Qualcomm Incorproated, San Diego, CA (US)

( * ) Notice: Subject to any disclaimer, the term of this patent is extended or adjusted under 35 U.S.C. 154(b) by 188 days.

(21) Appl. No.: 16/443,954

(22) Filed: Jun. 18, 2019

(65) Prior Publication Data

US 2020/0401461 A1 Dec. 24, 2020

(51) Int. Cl.
*G06F 9/46* (2006.01)
*G06F 9/52* (2006.01)

(52) U.S. Cl.
CPC .......... *G06F 9/52* (2013.01); *G06F 2209/522* (2013.01)

(58) Field of Classification Search
CPC .............................. G06F 9/52; G06F 2209/522
See application file for complete search history.

(56) References Cited

U.S. PATENT DOCUMENTS

| | | | | | |
|---|---|---|---|---|---|
| 5,339,443 | A | * | 8/1994 | Lockwood | G06F 15/167 710/244 |
| 6,026,427 | A | * | 2/2000 | Nishihara | G06F 9/52 718/102 |
| 2002/0083276 | A1 | * | 6/2002 | Nieuwland | G06F 9/52 711/147 |
| 2003/0041173 | A1 | * | 2/2003 | Hoyle | G06F 9/526 709/248 |
| 2004/0148607 | A1 | * | 7/2004 | Circenis | G06F 9/526 718/102 |
| 2004/0260890 | A1 | * | 12/2004 | Hoogerbrugge | G06F 9/52 711/150 |
| 2012/0271972 | A1 | * | 10/2012 | Eilebrecht | G06F 9/52 710/18 |
| 2013/0198499 | A1 | * | 8/2013 | Dice | G06F 9/3846 712/239 |

(Continued)

*Primary Examiner* — Adam Lee
(74) *Attorney, Agent, or Firm* — Withrow & Terranova, PLLC

(57) ABSTRACT

Providing self-resetting multi-producer multi-consumer semaphores in distributed processor-based systems is disclosed. In one aspect, a synchronization management circuit provides a semaphore including a counting semaphore value indicator, a current wait count indicator, and a target wait count indicator. When a consumer completes a wait operation, the synchronization management circuit adjusts the value of the current wait count indicator towards the value of the target wait count indicator, and compares the value of the current wait count indicator to the value of the target wait count indicator. If the value of the current wait count indicator has reached the value of the target wait count indicator, the synchronization management circuit infers that all consumers have observed the semaphore, and accordingly resets both the counting semaphore value indicator and the current wait count indicator to an initial wait value to place the semaphore in its initial state for reuse.

30 Claims, 10 Drawing Sheets

(56) References Cited

U.S. PATENT DOCUMENTS

| | | | |
|---|---|---|---|
| 2014/0172790 A1* | 6/2014 | Pathak | G06F 16/27 |
| | | | 707/613 |
| 2016/0072883 A1* | 3/2016 | Long | G06F 11/16 |
| | | | 709/219 |
| 2016/0267622 A1* | 9/2016 | Brothers | G06T 1/20 |
| 2016/0275097 A1* | 9/2016 | Bain | G06F 16/2343 |
| 2017/0286186 A1* | 10/2017 | Kagan | G06F 9/4812 |
| 2018/0054692 A1* | 2/2018 | Ahn | H04W 4/60 |

* cited by examiner

PROVIDING SELF-RESETTING MULTI-PRODUCER MULTI-CONSUMER SEMAPHORES IN DISTRIBUTED PROCESSOR-BASED SYSTEMS

BACKGROUND

I. Field of the Disclosure

The technology of the disclosure relates generally to coherency management in distributed processor-based systems, and, in particular, to techniques and apparatus for providing coherency using semaphores.

II. Background

Distributed processor-based systems, such as those used for machine learning applications, provide multiprocessing capabilities through the use of multiple processor devices that are each configured to concurrently execute one or more separate processes while communicating and cooperating with other processor devices to share resources. One example of a distributed processor-based system is a machine learning accelerator that includes multiple processor devices, or "slices," communicating with each other and with other shared resources via a shared network-on-chip (NOC). However, because the NOC of the machine learning accelerator may not enforce coherency, a mechanism may be required to synchronize data movement between the slices and to control access to shared resources such as data buffers.

One conventional mechanism for synchronizing access to a common resource is a semaphore, which is a data construct for tracking the availability of the common resource and allowing consumers (i.e., processing devices seeking access to the common resource) to wait for the resource to become available. Mechanisms using conventional semaphores, though, may prove cumbersome in scenarios where synchronization is required between multiple producers (i.e., processing devices that provide data) and multiple consumers.

For example, FIGS. 1A and 1B illustrate two approaches for providing multi-producer, multi-consumer synchronization using multiple semaphores. The approach in FIG. 1A uses a plurality of semaphores 100(0)-100(3) corresponding to a plurality of consumers 102(0)-102(3), such that each consumer of the plurality of consumers 102(0)-102(3) is associated with one semaphore of the plurality of semaphores 100(0)-100(3). Each of the consumers 102(0)-102(3) requires data from more than one of a plurality of producers 104(0)-104(4). For instance, the consumer 102(0) requires data from the producer 104(0) and the producer 104(2), while the consumer 102(1) requires data from the producer 104(1), the producer 104(2), and the producer 104(3). As a result, in this approach, each of the producers 104(0)-104(4) must increment the semaphores 100(0)-100(3) corresponding to the consumers 102(0)-102(3) that need their data. This approach requires a large number of semaphores, as well as multiple increment commands from each of the producers 104(0)-104(4).

Another approach, shown in FIG. 1B, uses multiple semaphores 106(0)-106(4) that correspond to each of a plurality of producers 108(0)-108(4), such that each producer of the plurality of producers 108(0)-108(4) is associated with one semaphore of the plurality of semaphores 106(0)-106(4). In the approach illustrated in FIG. 1B, each of consumers 110(0)-110(3) must wait for each semaphore 106(0)-106(4) corresponding to the producers 108(0)-108(4) providing the required data. Consequently, this approach also requires a large number of semaphores, and multiple wait commands from each of the consumers 110(0)-110(3). These approaches may be further complicated by difficulties inherent in resetting semaphores in multi-processor systems. For example, there may not exist a single entity that can first determine when all consumers have observed a semaphore and then subsequently reset the semaphore. Such systems may require a separate mechanism for observing and resetting semaphores at an appropriate time.

Accordingly, it is desirable to provide a mechanism for providing more efficient semaphores for use in multi-producer multi-consumer scenarios, particularly in scenarios in which multiple producers produce data for multiple consumers and all consumers must wait for all producers to generate data before proceeding.

SUMMARY OF THE DISCLOSURE

Aspects disclosed in the detailed description include providing self-resetting multi-producer multi-consumer semaphores in distributed processor-based systems. In this regard, in one aspect, a synchronization management circuit of a distributed processor-based system provides a semaphore that includes a counting semaphore value indicator, a current wait count indicator, and a target wait count indicator. The synchronization management circuit uses the counting semaphore value indicator to track a current value of the semaphore (which may correspond to, e.g., a number of producers from whom data is ready to be consumed), while the current wait count indicator is used to track a number of consumers that have completed wait operations. The target wait count indicator is used by the synchronization management circuit to represent a value against which the current value of the semaphore is compared to determine when to reset the semaphore. For example, the target wait count indicator may represent a maximum number of waiting consumers. In one exemplary operation, the counting semaphore value indicator may be incremented, decremented, or waited on using corresponding semaphore commands. When a wait operation is completed by a consumer, the synchronization management circuit adjusts the value of the current wait count indicator towards the value of the target wait count indicator (e.g., by incrementing or decrementing the current wait count indicator). The synchronization management circuit then compares the value of the current wait count indicator to the value of the target wait count indicator. If the value of the current wait count indicator has reached the value of the target wait count indicator, the synchronization management circuit can infer that all consumers have observed the semaphore, and accordingly the synchronization management circuit resets the counting semaphore value indicator to an initial semaphore value and the current wait count indicator to an initial wait value to place the semaphore in its initial state for reuse.

In another aspect, a distributed processor-based system is provided. The distributed processor-based system comprises a plurality of processor devices, and a synchronization management circuit communicatively coupled to the plurality of processor devices and comprising a plurality of semaphores. Each of the plurality of semaphores comprises a counting semaphore value indicator, a current wait count indicator, and a target wait count indicator. The synchronization management circuit is configured to determine that a value of a current wait count indicator of a semaphore of the plurality of semaphores equals a value of a target wait count indicator of the semaphore. The synchronization management circuit is further configured to, responsive to determining that the value of the current wait count indicator of the semaphore equals the value of the target wait count indicator of the semaphore, reset a value of a counting semaphore value indicator of the semaphore to an initial semaphore value. The synchronization management circuit is also configured to reset the value of the current wait count indicator of the semaphore to an initial wait value responsive to determining that the value of the current wait count indicator of the semaphore equals the value of the target wait count indicator of the semaphore.

In another aspect, a distributed processor-based system for providing a self-resetting multi-producer multi-consumer semaphore is provided. The distributed processor-based system comprises a means for determining that a value of a current wait count indicator of a semaphore equals a value of a target wait count indicator of the semaphore. The distributed processor-based system further comprises a means for resetting a value of a counting semaphore value indicator of the semaphore to an initial semaphore value, responsive to determining that the value of the current wait count indicator of the semaphore equals the value of the target wait count indicator of the semaphore. The distributed processor-based system also comprises a means for resetting the value of the current wait count indicator to an initial wait value, responsive to determining that the value of the current wait count indicator of the semaphore equals the value of the target wait count indicator of the semaphore.

In another aspect, a method for providing a self-resetting multi-producer multi-consumer semaphore is provided. The method comprises determining that a value of a current wait count indicator of a semaphore equals a value of a target wait count indicator of the semaphore. The method further comprises, responsive to determining that the value of the current wait count indicator of the semaphore equals the value of the target wait count indicator of the semaphore, resetting a value of a counting semaphore value indicator of the semaphore to an initial semaphore value. The method also comprises, responsive to determining that the value of the current wait count indicator of the semaphore equals the value of the target wait count indicator of the semaphore, resetting the value of the current wait count indicator to an initial wait value.

In another aspect, a computer program product stored on a non-transitory computer-readable storage medium is provided. The computer program product includes instructions that, when executed by a processor device, cause the processor device to determine that a value of a current wait count indicator of a semaphore equals a value of a target wait count indicator of the semaphore. The instructions further cause the processor device to, responsive to determining that the value of the current wait count indicator of the semaphore equals the value of the target wait count indicator of the semaphore, reset a value of a counting semaphore value indicator of the semaphore to an initial semaphore value. The instructions further cause the processor device to, responsive to determining that the value of the current wait count indicator of the semaphore equals the value of the target wait count indicator of the semaphore, reset the value of the current wait count indicator to an initial wait value.

DETAILED DESCRIPTION

Figure 1A:
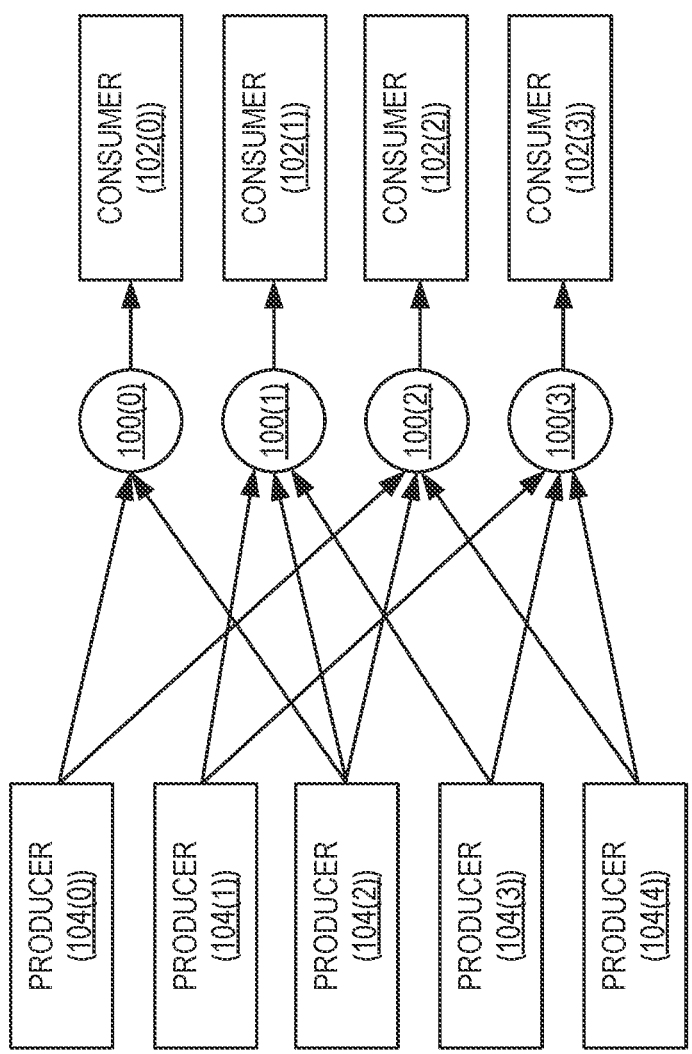
FIGS. 1A and 1B are block diagrams of conventional approaches for providing multi-producer, multi-consumer coherency using multiple semaphores.
Figure 1B:
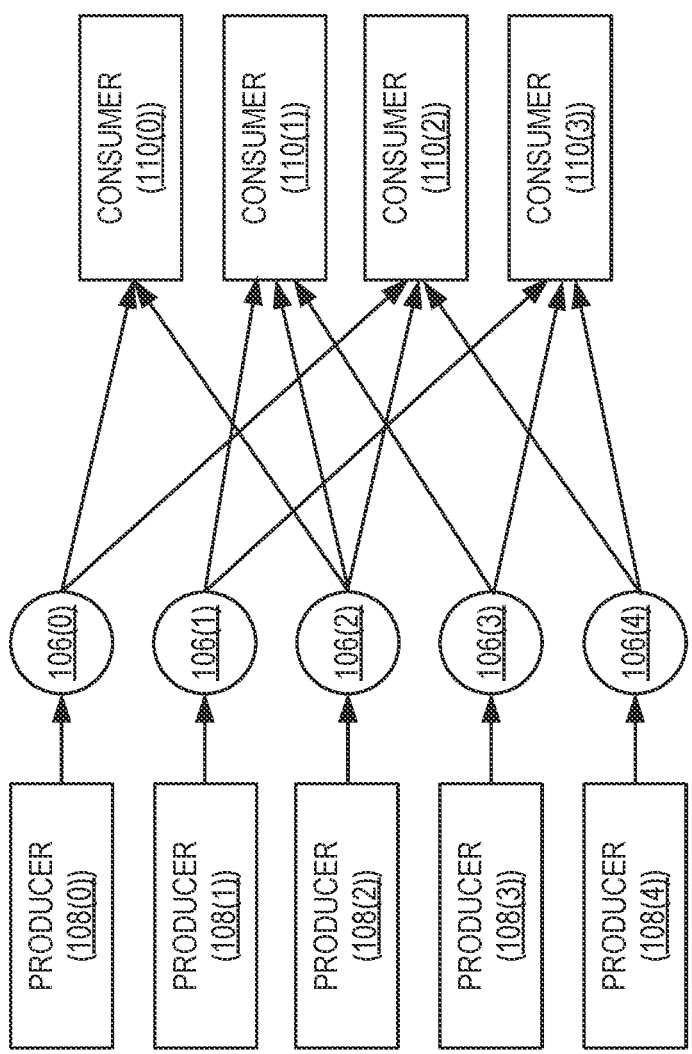

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 2A:
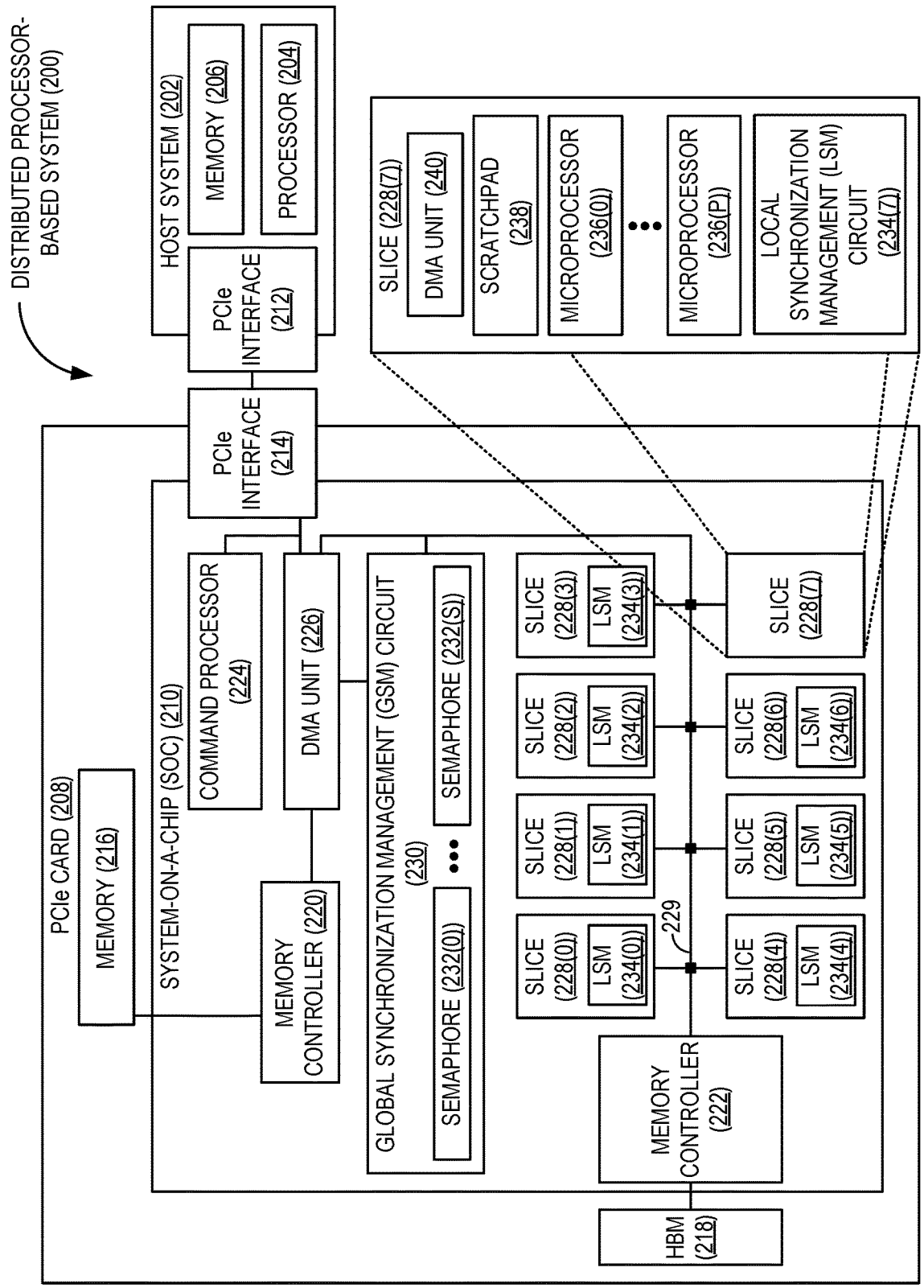
FIGS. 2A and 2B are block diagrams of an exemplary distributed processor-based system for providing self-resetting multi-producer multi-consumer semaphores.
Figure 2B:
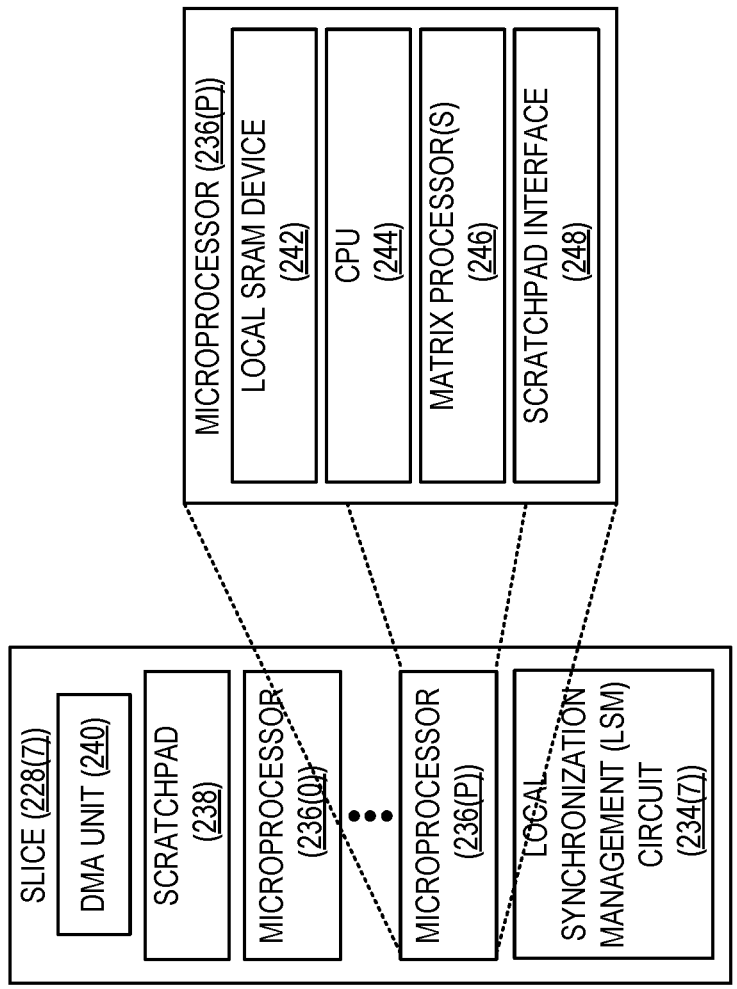

Aspects disclosed in the detailed description include providing self-resetting multi-producer multi-consumer semaphores in distributed processor-based systems. In this regard, FIGS. 2A and 2B illustrate an exemplary distributed processor-based system 200 (e.g., configured to provide flexible and efficient machine learning processing, as a non-limiting example). Referring to FIG. 2A, the distributed processor-based system 200 includes a host system 202, which in some aspects may comprise an ARM®- or INTEL® x86-based server computer. The host system 202 includes a processor 204 (e.g., one or more central processing units (CPUs), processors, and/or processor cores) and memory 206 (e.g., double data rate (DDR) synchronous dynamic random access memory (SDRAM) (DDR SDRAM)). The distributed processor-based system 200 further provides a Peripheral Component Interconnect Express (PCIe) card 208, on which a system-on-a-chip (SoC) 210 is configured to communicate with the host system 202 via a PCIe interface 212 of the host system 202 and a PCIe interface 214 of the SoC 210. The PCIe card 208 also includes memory 216 (e.g., DDR SDRAM) and high-bandwidth memory (HBM) 218, which interface with the SoC 210 via a memory controller 220 and a memory controller 222, respectively.

The SoC 210 provides a command processor 224, which in some aspects may comprise a conventional processor such as an ARM®- or INTEL® x86-based processor. The SoC 210 also includes a direct memory access (DMA) unit 226 that is configured to move data to and from the memory 216 and the PCIe interface 214, and thereby to and from the host system 202. The SoC 210 of FIGS. 2A and 2B provides eight (8) processor devices ("slices") 228(0)-228(7), which are interconnected by a network-on-chip (NoC) 229. It is to be understood that, in some aspects, the SoC 210 may include more or fewer slices 228 than illustrated in FIGS. 2A and 2B.

In the example of FIGS. 2A and 2B, it is to be understood that the NoC 229 that interconnects the slices 228(0)-228(7) and the DMA unit 226 does not enforce coherency. Accordingly, to synchronize accesses to system resources by the slices 228(0)-228(7), the SoC 210 includes a global synchronization management (GSM) circuit 230, which provides a plurality of semaphores 232(0)-232(S). Each of the semaphores 232(0)-232(S) is configured to operate as a self-resetting multi-producer multi-consumer semaphore, as described in greater detail below with respect to FIGS. 3 and 4. Additionally, each of the slices 228(0)-228(7) includes a corresponding local synchronization management (LSM) circuit 234(0)-234(7), which coordinate with the GSM circuit 230 to provide synchronization functionality. The GSM circuit 230 may be referred to more generally herein as a "synchronization management circuit 230." It is to be understood that, in some aspects, the semaphores 232(0)-232(S) may also be configured to operate in a conventional manner (e.g., not self-resetting).

To illustrate the constituent elements of the slices 228(0)-228(7), FIGS. 2A and 2B show an expanded view of the slice 228(7). The slice 228(7) comprises the LSM circuit 234(7) as discussed above, as well as a plurality of microprocessors 236(0)-236(P) and a scratchpad 238 that is accessible by any of the slices 228(0)-228(7). To move data into and out of the scratchpad 238, the slice 228(7) provides a DMA unit 240, which is communicatively coupled to the NoC 229 of FIG. 2A. It is to be understood that, in this example, each of the slices 228(0)-228(7) includes elements corresponding to the elements of the slice 228(7) described above.

FIG. 2B provides a more detailed view of the constituent elements of the microprocessors 236(0)-236(P) of the slice 228(7) of FIGS. 2A and 2B, using the microprocessor 236(P) as an example. As seen in FIG. 2B, the microprocessor 236(P) provides a local static random access memory (SRAM) device 242, a central processing unit (CPU) 244 (e.g., a RISC-V processing device), and one or more matrix processors 246. The microprocessor 236(P) further includes a scratchpad interface 248 that allows the microprocessor 236(P) to access the scratchpad 238 of the slice 228(7).

The distributed processor-based system 200 and its constituent elements as illustrated in FIGS. 2A and 2B may encompass any known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor sockets or packages. It is to be understood that some aspects of the distributed processor-based system 200 may include elements in addition to those illustrated in FIGS. 2A and 2B, and/or may omit some elements illustrated in FIGS. 2A and 2B.

As referenced above, the GSM circuit 230 of FIG. 2A is configured to provide the semaphores 232(0)-232(S) to synchronize operations between the slices 228(0)-228(7), and to synchronize operations between the host system 202 and the slices 228(0)-228(7). For example, synchronization may be needed in scenarios in which a slice 228(0)-228(7) must wait for data to be transferred from the host system 202 before operations requiring the data can begin, or a slice 228(0)-228(7) must wait for data to be transferred from another slice 228(0)-228(7) before operations requiring the data can begin. The GSM circuit 230 may also be used for synchronizing operations in scenarios in which the DMA unit 226 must wait for results of computations to become available before the results can be written back to the memory 206 of the host system 202.

The semaphores 232(0)-232(S) of the GSM circuit 230 are provided to address a particular scenario in which it is desirable to use a single semaphore to synchronize data movement from multiple producers to multiple consumers, with the requirement that all producers complete data movement before any consumers can proceed. In one such scenario, the semaphore would begin with a value of zero (0), and each producer would increment the semaphore when its corresponding data movement has completed. The consumers would then be able to determine that all data movement has been completed when the semaphore reaches a value equal to the number of producers. Alternatively, the semaphore may be initialized to a value equal to the number of producers, and each producer would decrement the semaphore when its corresponding data movement has completed. The consumers would then be able to determine that all data movement has been completed when the semaphore reaches a value of zero (0). However, to reset the semaphore for reuse in either scenario, a mechanism is required both to determine when all consumers have observed the semaphore and to reset the semaphore to its initial state.

Figure 3:
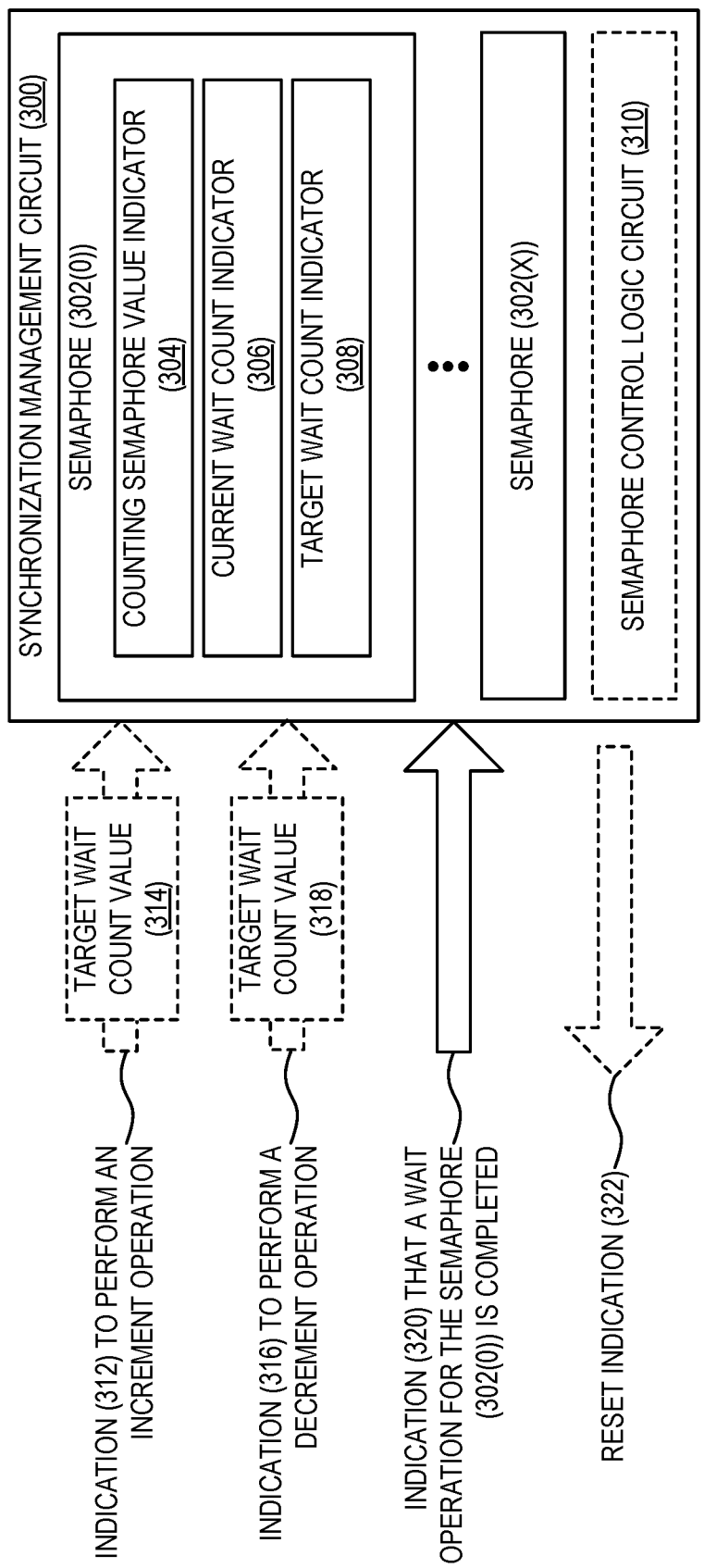
FIG. 3 is a block diagram illustrating constituent elements of a semaphore provided by a synchronization management circuit of the processor-based system of FIGS. 2A and 2B.

In this regard, FIG. 3 illustrates constituent elements of a synchronization management circuit 300, such as the GSM circuit 230 of FIG. 2A. The synchronization management circuit 300 is configured to provide a plurality of semaphores 302(0)-302(X), corresponding in functionality to the semaphores 232(0)-232(S) of FIG. 2A. In this example, the number X is an integer representing an implementation-specific number of semaphores, and may indicate, for instance, an estimated maximum number of semaphores that may be in simultaneous use. As seen in FIG. 3, the semaphore 302(0) includes a counting semaphore value indicator 304, a current wait count indicator 306, and a target wait count indicator 308. The counting semaphore value indicator 304 tracks a current value of the semaphore 302(0), which in some aspects may correspond to a number of producers (e.g., one or more of the slices 228(0)-228(7) and/or specific processes executing thereon) from which data is ready to be consumed. The current wait count indicator 306 tracks a number of consumers (e.g., one or more of the slices 228(0)-228(7) and/or specific processes executing thereon) that have waited to consume data. The target wait count indicator 308 represents a value used by the synchronization management circuit 300 to determine when to reset the semaphore 302(0) for a next use.

Although not illustrated in FIG. 3, it is to be understood that other semaphores of the plurality of semaphores 302(1)-302(X) include indicators corresponding to those illustrated for the semaphore 302(0), and may be employed in parallel with the semaphore 302(0), for example, to track interactions between other groups of producers and consumers. In some aspects, the synchronization management circuit 300 also includes a semaphore control logic circuit 310 for executing operations using the semaphores 302(0)-302(X) of the synchronization management circuit 300. Some aspects may provide that the operations using the semaphores 302(0)-302(X) of the synchronization management circuit 300 may be executed using one or more specialized instructions provided by an underlying instruction set architecture of the slices 228(0)-228(7). In some aspects, the semaphores 232(0)-232(S) are operated in a conventional manner (e.g., not self-resetting) by setting the target wait count indicator 308 to a predetermined maximum value.

The synchronization management circuit 300 supports conventional semaphore commands for performing initialize, increment, decrement, wait, and wait-and-decrement operations on the semaphores 302(0)-302(X), with the additional functionality described herein. In some aspects, when the synchronization management circuit 300 receives an indication 312 to perform an increment operation on the semaphore 302(0) (e.g., from one of the LSM circuits 234(0)-234(7) of FIG. 2A in response to execution of a semaphore increment instruction), the counting semaphore value indicator 304 is incremented. Additionally, the indication 312 provides a target wait count value 314, which is used by the synchronization management circuit 300 to set the value of the target wait count indicator 308. Similarly, some aspects provide that the synchronization management circuit 300 may receive an indication 316 to perform a decrement operation on the semaphore 302(0) (e.g., from one of the LSM circuits 234(0)-234(7) of FIG. 2A in response to execution of a semaphore decrement instruction), in which case the counting semaphore value indicator 304 is decremented. The indication 316 also includes a target wait count value 318, which is used by the synchronization management circuit 300 to set the value of the target wait count indicator 308.

When the synchronization management circuit 300 receives an indication 320 that a wait operation for the semaphore 302(0) is completed (e.g., from one of the LSM circuits 234(0)-234(7) of FIG. 2A), the synchronization management circuit 300 adjusts the value of the current wait count indicator 306 of the semaphore 302(0) towards the value of the target wait count indicator 308 of the semaphore 302(0). For example, in aspects in which the current wait count indicator 306 is set to an initial wait value of zero (0) and the target wait count indicator is a non-zero integer, the synchronization management circuit 300 may increment the current wait count indicator 306. Conversely, in aspects in which the current wait count indicator 306 is set to a non-zero initial wait value and the target wait count indicator has a value of zero (0), the synchronization management circuit 300 may decrement the current wait count indicator 306. The synchronization management circuit 300 then compares the value of the current wait count indicator 306 to the value of the target wait count indicator 308. If the value of the current wait count indicator 306 has reached the value of the target wait count indicator 308, the synchronization management circuit 300 can infer that all consumers have observed the semaphore 302(0). The synchronization management circuit thus resets the counting semaphore value indicator 304 to an initial semaphore value, and similarly resets the current wait count indicator 306 to an initial wait value, which places the semaphore 302(0) in a ready state for its next use. The synchronization management circuit 300 in some aspects may also broadcast a reset indication 322 to the LSM circuits 234(0)-234(7) to inform producers and consumers that the semaphore 302(0) has been reset.

Figure 4:
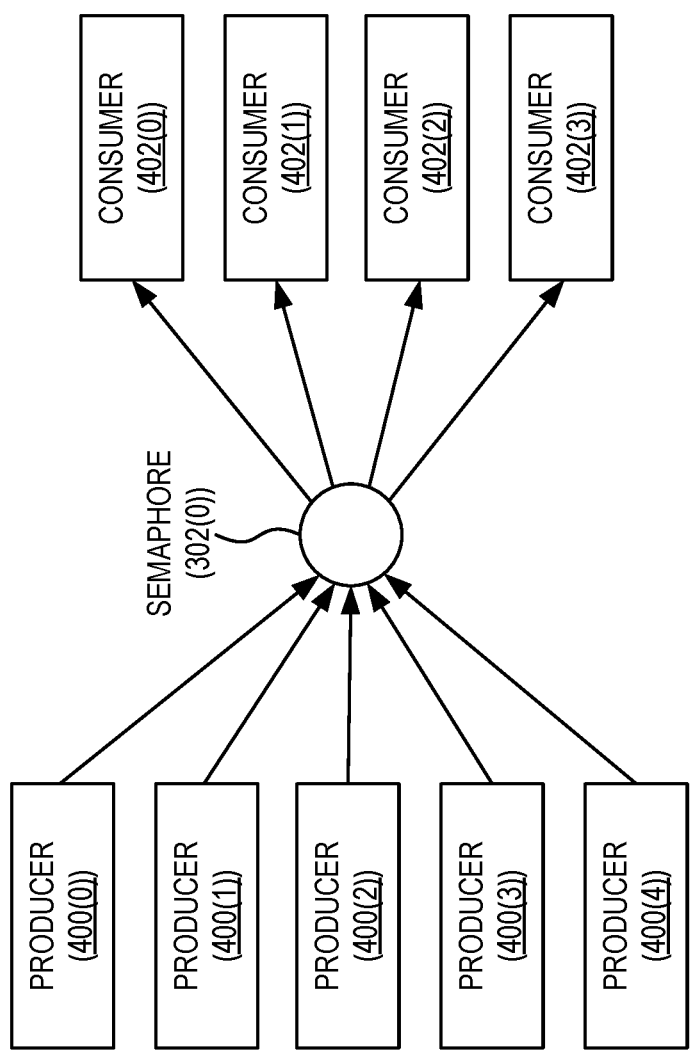
FIG. 4 is a block diagram illustrating a single semaphore approach for providing multi-producer multi-consumer coherency.

FIG. 4 illustrates a single semaphore approach for providing multi-producer multi-consumer coherency using the semaphore 302(0) of FIG. 3. As seen in FIG. 4, the semaphore 302(0) is associated with multiple producers 400(0)-400(4) and multiple consumers 402(0)-402(3). Assume for purposes of this illustration that the current wait count indicator of the semaphore 302(0) is initialized to an initial wait value of zero (0), and that the value of the target wait count indicator of the semaphore 302(0) is set to a non-zero integer corresponding to the number of consumers 402(0)-402(3). Each of the multiple producers 400(0)-400(4) (which may be, as non-limiting examples, one or more of the slices 228(0)-228(7) of FIG. 2A, or individual processes executing thereon) increments the semaphore 302(0) as its corresponding data movement operations are completed. When the value of the counting semaphore value indicator of the semaphore 302(0) reaches a value specified by wait operations for the consumers 402(0)-402(3) (e.g., a value corresponding to the number of the producers 400(0)-400(4) in some aspects), the consumers 402(0)-402(3) (e.g., one or more of the slices 228(0)-228(7) of FIG. 2A, or individual processes executing thereon, as non-limiting examples) can complete their wait operations on the semaphore 302(0). As wait operations are completed, the value of the current wait count indicator (not shown) of the semaphore 302(0) is incremented. Once the value of the current wait count indicator equals the value of the target wait count indicator of the semaphore 302(0), the semaphore 302(0) is reset to its initial state for reuse.

Figure 5A:
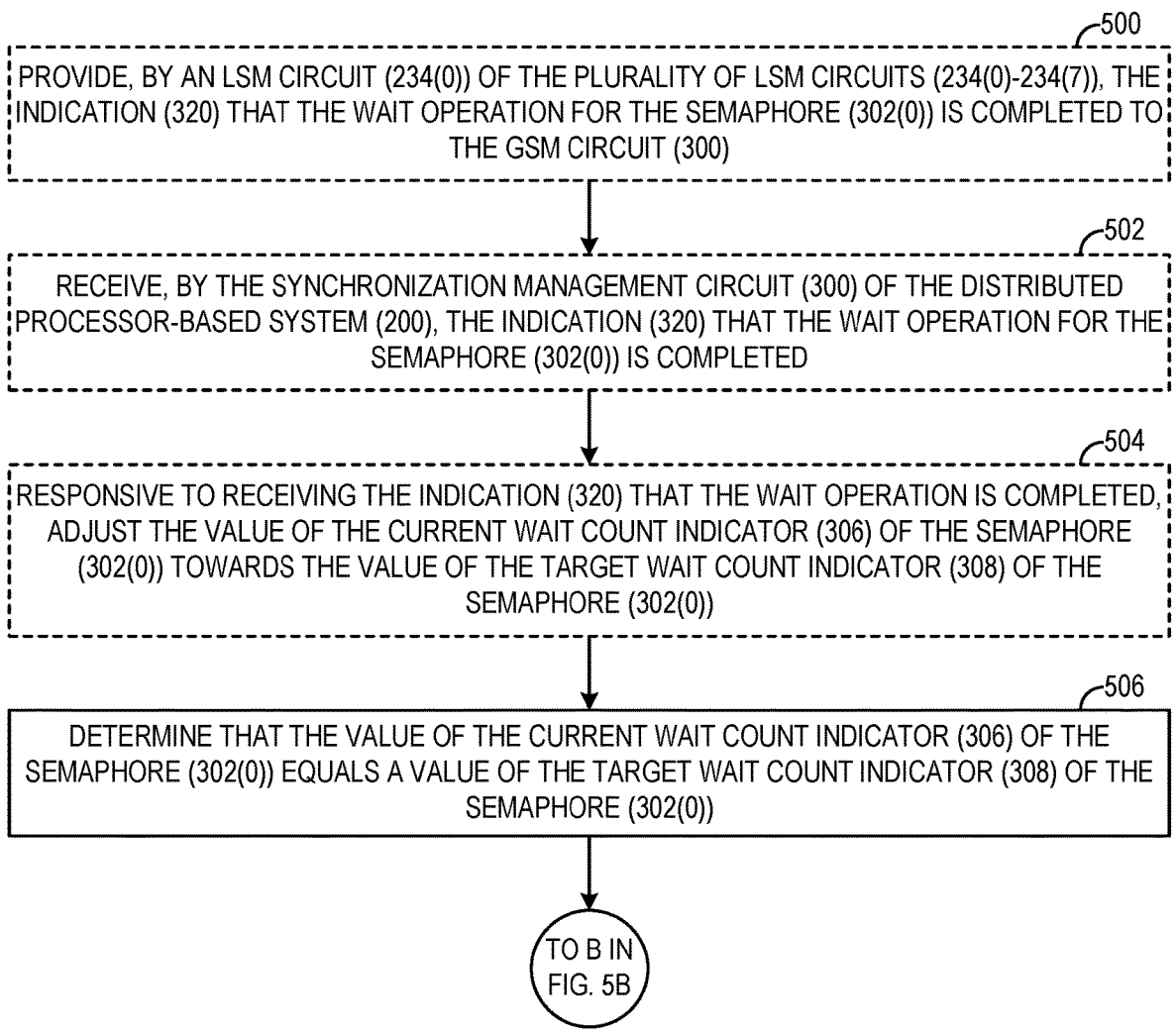
FIGS. 5A-5C are flowcharts illustrating exemplary operations of the distributed processor-based system of FIGS. 2A and 2B for providing self-resetting multi-producer multi-consumer semaphores.
Figure 5B:
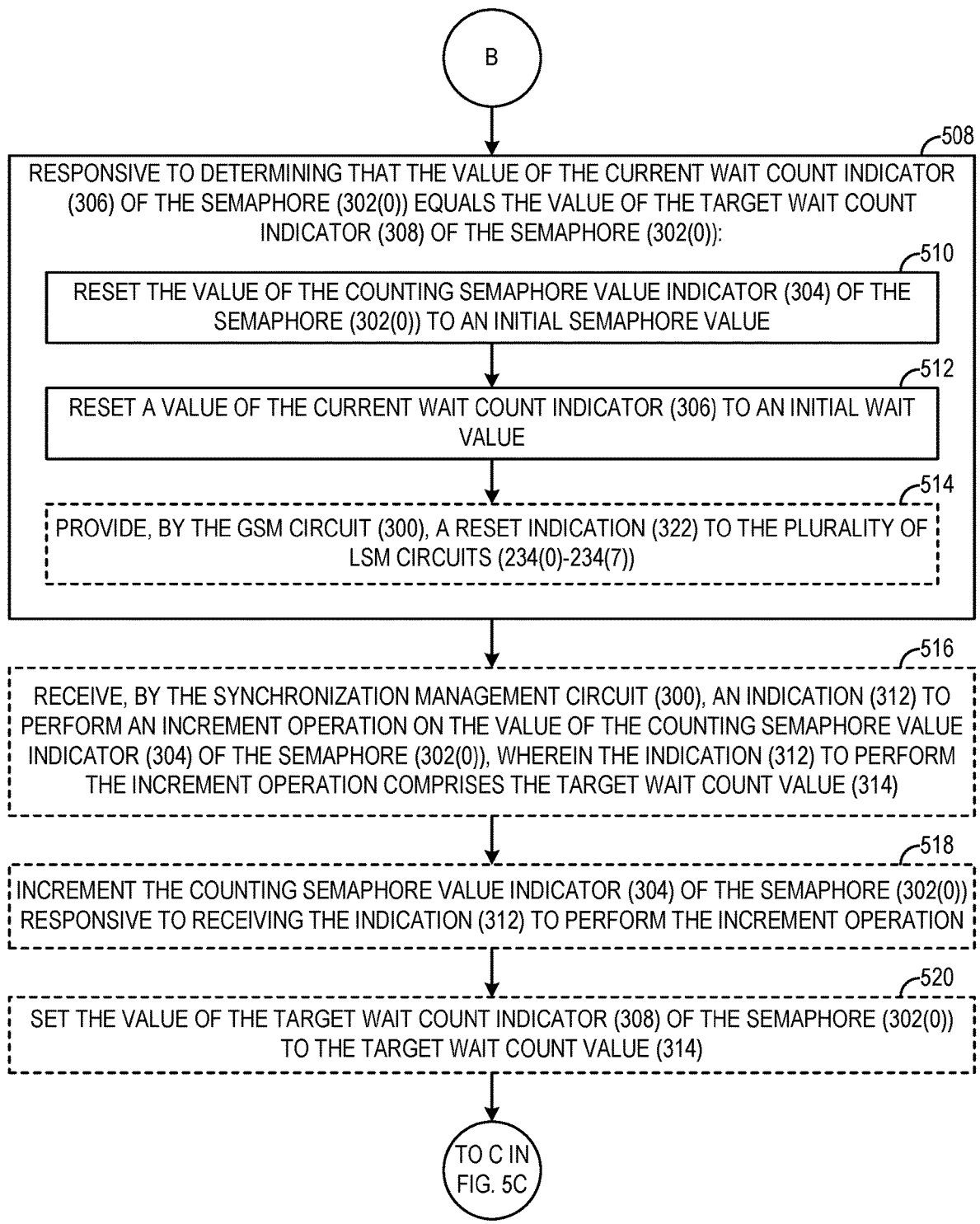
Figure 5C:
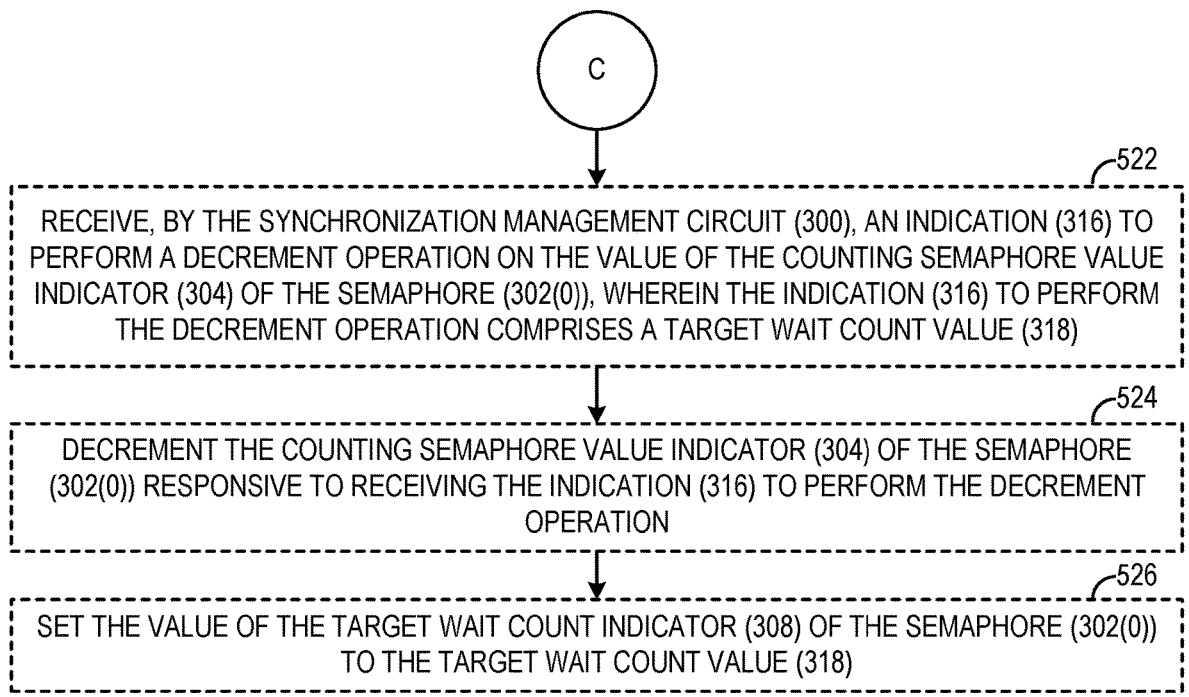

To illustrate exemplary operations of the distributed processor-based system 200 of FIGS. 2A and 2B for providing self-resetting multi-producer multi-consumer semaphores, FIGS. 5A-5C are provided. For the sake of clarity, elements of FIGS. 2A, 2B, and 3 are referenced in describing FIGS. 5A-5C. In FIG. 5A, operations according to some aspects begin with an LSM circuit, such as the LSM circuit 234(0) of the plurality of LSM circuits 234(0)-234(7) providing the indication 320 that the wait operation for the semaphore 302(0) is completed to the synchronization management circuit 300 (e.g., the GSM circuit 230 of FIG. 2A) (block 500). The synchronization management circuit 300 receives the indication 320 that the wait operation for the semaphore 302(0) is completed (block 502). In this regard, the synchronization management circuit 300 may be referred to herein as "a means for receiving an indication that a wait operation for a semaphore is completed."

Responsive to receiving the indication 320 that the wait operation is completed, the synchronization management circuit may adjust a value of the current wait count indicator 306 of the semaphore 302(0) towards the value of the target wait count indicator 308 of the semaphore 302(0) (block 504). Accordingly, the synchronization management circuit 300 may be referred to herein as "a means for adjusting the value of the current wait count indicator of the semaphore towards the value of the target wait count indicator of the semaphore, responsive to receiving the indication that the wait operation is completed." The synchronization management circuit 300 next determines that the value of the current wait count indicator 306 of the semaphore 302(0) equals a value of the target wait count indicator 308 of the semaphore 302(0) (block 506). The synchronization management circuit 300 thus may be referred to herein as "a means for determining that the value of the current wait count indicator of the semaphore equals a value of a target wait count indicator of the semaphore." Processing then resumes at block 508 of FIG. 5B.

Turning now to FIG. 5B, the synchronization management circuit 300 performs a series of operations responsive to determining that the value of the current wait count indicator 306 of the semaphore 302(0) equals the value of the target wait count indicator 308 of the semaphore 302(0) (block 508). The synchronization management circuit 300 resets the value of the counting semaphore value indicator 304 of the semaphore 302(0) to the initial semaphore value (block 510). In this regard, the synchronization management circuit 300 may be referred to herein as "a means for resetting a value of a counting semaphore value indicator of the semaphore to an initial semaphore value, responsive to determining that the value of the current wait count indicator of the semaphore equals the value of the target wait count indicator of the semaphore." The synchronization management circuit 300 also resets a value of the current wait count indicator 306 to an initial wait value (block 512). Accordingly, the synchronization management circuit 300 may be referred to herein as "a means for resetting a value of the current wait count indicator to an initial wait value, responsive to determining that the value of the current wait count indicator of the semaphore equals the value of the target wait count indicator of the semaphore." According to some aspects, the synchronization management circuit 300 may provide, by the synchronization management circuit 300 (e.g., the GSM circuit 230), a reset indication 322 to the plurality of LSM circuits 234(0)-234(7) (block 514).

In some aspects, the synchronization management circuit 300 may receive an indication 312 to perform an increment operation on the value of the counting semaphore value indicator 304 of the semaphore 302(0), wherein the indication 312 to perform the increment operation comprises the target wait count value 314 (block 516). The synchronization management circuit 300 thus may be referred to herein as "a means for receiving an indication to perform an increment operation on the value of the counting semaphore value indicator of the semaphore, wherein the indication to perform the increment operation comprises a target wait count value." The synchronization management circuit 300 in such aspects may increment the counting semaphore value indicator 304 of the semaphore 302(0) responsive to receiving the indication 312 to perform the increment operation (block 518). In this regard, the synchronization management circuit 300 may be referred to herein as "a means for incrementing the counting semaphore value indicator of the semaphore responsive to receiving the indication to perform the increment operation." The synchronization management circuit 300 may also set the value of the target wait count indicator 308 of the semaphore 302(0) to the target wait count value 314 (block 520). Accordingly, the synchronization management circuit 300 may be referred to herein as "a means for setting the value of the target wait count indicator of the semaphore to the target wait count value." Processing resumes at block 522 of FIG. 5C.

Turning now to FIG. 5C, the synchronization management circuit 300 according to some aspects may receive an indication 316 to perform a decrement operation on the value of the counting semaphore value indicator 304 of the semaphore 302(0), wherein the indication 316 to perform the decrement operation comprises a target wait count value 318 (block 522). The synchronization management circuit 300 thus may be referred to herein as "a means for receiving an indication to perform a decrement operation on the value of the counting semaphore value indicator of the semaphore, wherein the indication to perform the decrement operation comprises a target wait count value." The synchronization management circuit 300 then decrements the counting semaphore value indicator 304 of the semaphore 302(0) responsive to receiving the indication 316 to perform the decrement operation (block 524). In this regard, the synchronization management circuit 300 may be referred to herein as "a means for decrementing the counting semaphore value indicator of the semaphore responsive to receiving the indication to perform the decrement operation." The synchronization management circuit 300 also sets the value of the target wait count indicator 308 of the semaphore 302(0) to the target wait count value 318 (block 526). Accordingly, the synchronization management circuit 300 may be referred to herein as "a means for setting the value of the target wait count indicator of the semaphore to the target wait count value."

Providing self-resetting multi-producer multi-consumer semaphores in distributed processor-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
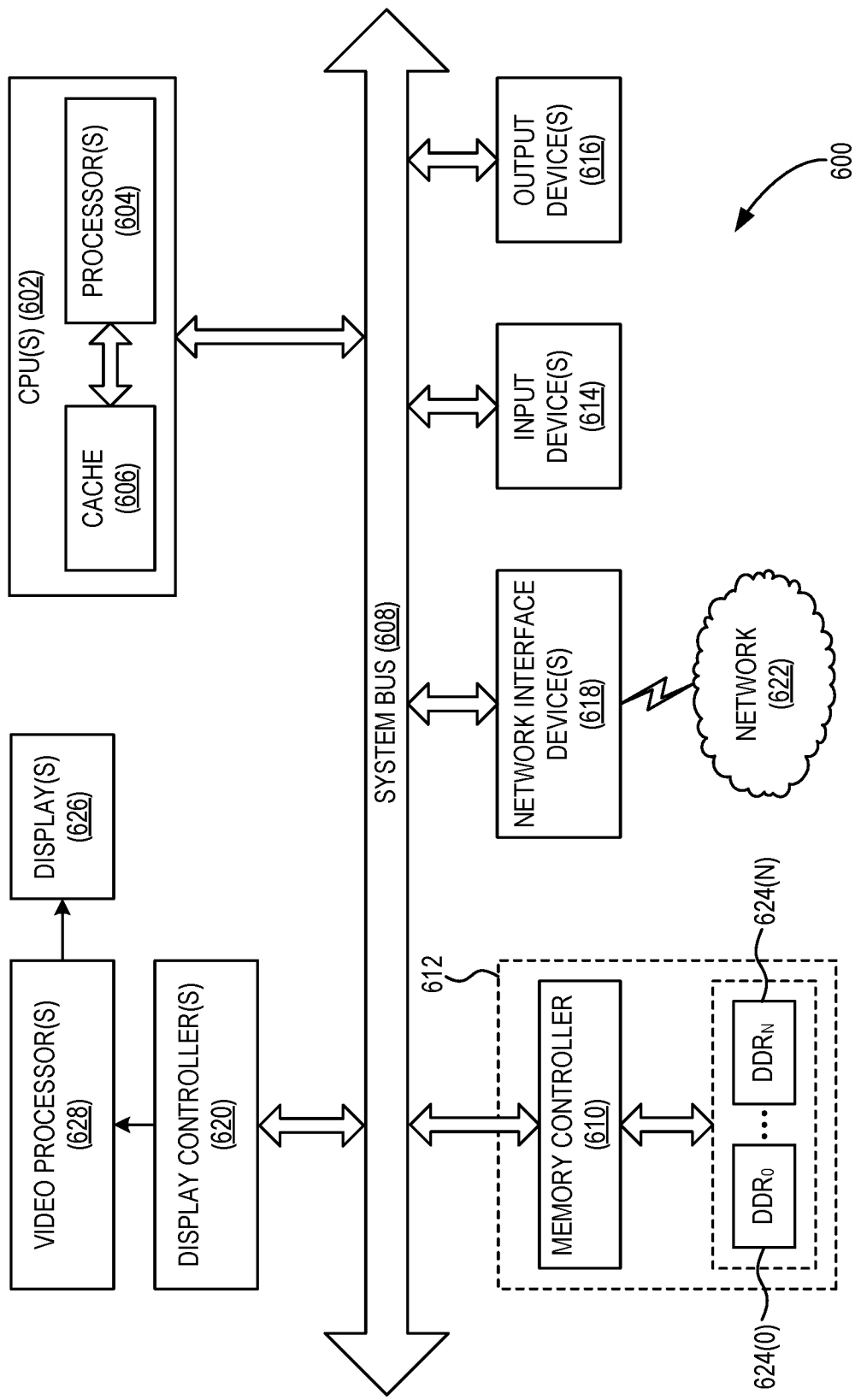
FIG. 6 is a block diagram of an exemplary processor-based system that can comprise the processor-based system of FIGS. 2A and 2B for providing self-resetting multi-producer multi-consumer semaphores.

In this regard, FIG. 6 illustrates an example of a processor-based system 600 that may comprise the distributed processor-based system 200 of FIGS. 2A and 2B. The processor-based system 600 includes one or more CPU(s) 602, each including one or more processor(s) 604. The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device.

Other master and slave devices can be connected to the system bus 608. As illustrated in FIG. 6, these devices can include a memory system 612, one or more input device(s) 614, one or more output device(s) 616, one or more network interface device(s) 618, and one or more display controller(s) 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any type of device configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0)-624(N).

The CPU(s) 602 may also be configured to access the display controller(s) 620 over the system bus 608 to control information sent to one or more display(s) 626. The display controller(s) 620 sends information to the display(s) 626 to be displayed via one or more video processor(s) 628, which process the information to be displayed into a format suitable for the display(s) 626. The display(s) 626 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A distributed processor-based system, comprising:
    a plurality of processor devices; and
    a synchronization management circuit communicatively coupled to the plurality of processor devices and comprising a plurality of self-resetting multi-producer multi-consumer semaphores each comprising:
        a counting semaphore value indicator;
        a current wait count indicator; and
        a target wait count indicator;
    the synchronization management circuit configured to:
        determine that a value of a current wait count indicator of a semaphore of the plurality of semaphores equals a value of a target wait count indicator of the semaphore; and
        responsive to determining that the value of the current wait count indicator of the semaphore equals the value of the target wait count indicator of the semaphore:
            reset a value of a counting semaphore value indicator of the semaphore to an initial semaphore value; and
            reset the value of the current wait count indicator of the semaphore to an initial wait value.

2. The distributed processor-based system of claim 1, wherein the synchronization management circuit is further configured to:
    receive an indication that a wait operation for the semaphore of the plurality of semaphores is completed; and
    responsive to receiving the indication that the wait operation for the semaphore is completed, adjust the value of the current wait count indicator of the semaphore towards the value of the target wait count indicator of the semaphore.

3. The distributed processor-based system of claim 2, wherein:
    the value of the target wait count indicator of the semaphore is a positive non-zero integer;
    the initial wait value is zero (0); and
    the synchronization management circuit is configured to adjust the value of the current wait count indicator of the semaphore towards the value of the target wait count indicator of the semaphore by incrementing the current wait count indicator of the semaphore.

4. The distributed processor-based system of claim 2, wherein:
    the value of the target wait count indicator of the semaphore is zero (0);
    the initial wait value is a positive non-zero integer; and
    the synchronization management circuit is configured to adjust the value of the current wait count indicator of the semaphore towards the value of the target wait count indicator of the semaphore by decrementing the current wait count indicator of the semaphore.

5. The distributed processor-based system of claim 2, wherein the synchronization management circuit comprises a global synchronization management (GSM) circuit communicatively coupled to a plurality of local synchronization management (LSM) circuits corresponding to the plurality of processor devices of the distributed processor-based system.

6. The distributed processor-based system of claim 2, wherein an LSM circuit of the plurality of LSM circuits is configured to provide, to the GSM circuit, the indication that the wait operation for the semaphore is completed.

7. The distributed processor-based system of claim 2, wherein the GSM circuit is configured to, responsive to determining that the value of the current wait count indicator of the semaphore equals the value of the target wait count indicator of the semaphore, provide a reset indication to the plurality of LSM circuits.

8. The distributed processor-based system of claim 1, wherein the synchronization management circuit is further configured to:
 receive an indication to perform an increment operation on the value of the counting semaphore value indicator of the semaphore, wherein the indication to perform the increment operation comprises a target wait count value;
 increment the counting semaphore value indicator of the semaphore responsive to receiving the indication to perform the increment operation; and
 set the value of the target wait count indicator of the semaphore to the target wait count value.

9. The distributed processor-based system of claim 1, wherein the synchronization management circuit is further configured to:
 receive an indication to perform a decrement operation on the value of the counting semaphore value indicator of the semaphore, wherein the indication to perform the decrement operation comprises a target wait count value;
 decrement the counting semaphore value indicator of the semaphore responsive to receiving the indication to perform the decrement operation; and
 set the value of the target wait count indicator of the semaphore to the target wait count value.

10. The distributed processor-based system of claim 1 integrated into an integrated circuit (IC).

11. The distributed processor-based system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile processor-based device; a wearable processor-based device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

12. A distributed processor-based system for providing a self-resetting multi-producer multi-consumer semaphore, comprising:
 a means for determining that a value of a current wait count indicator of the self-resetting multi-producer multi-consumer semaphore equals a value of a target wait count indicator of the semaphore;
 a means for resetting a value of a counting semaphore value indicator of the semaphore to an initial semaphore value, responsive to determining that the value of the current wait count indicator of the semaphore equals the value of the target wait count indicator of the semaphore; and
 a means for resetting the value of the current wait count indicator to an initial wait value, responsive to determining that the value of the current wait count indicator of the semaphore equals the value of the target wait count indicator of the semaphore.

13. The distributed processor-based system of claim 12, further comprising:
 a means for receiving an indication that a wait operation for the semaphore is completed; and
 a means for adjusting the value of the current wait count indicator of the semaphore towards the value of the target wait count indicator of the semaphore, responsive to receiving the indication that the wait operation is completed.

14. The distributed processor-based system of claim 13, wherein:
 the value of the target wait count indicator of the semaphore is a positive non-zero integer;
 the initial wait value is zero (0); and
 the means for adjusting the value of the current wait count indicator of the semaphore towards the value of the target wait count indicator of the semaphore comprises a means for incrementing the current wait count indicator of the semaphore.

15. The distributed processor-based system of claim 13, wherein:
 the value of the target wait count indicator of the semaphore is zero (0);
 the initial wait value is a positive non-zero integer; and
 the means for adjusting the value of the current wait count indicator of the semaphore towards the value of the target wait count indicator of the semaphore comprises a means for decrementing the current wait count indicator of the semaphore.

16. The distributed processor-based system of claim 12, further comprising:
 a means for receiving an indication to perform an increment operation on the value of the counting semaphore value indicator of the semaphore, wherein the indication to perform the increment operation comprises a target wait count value;
 a means for incrementing the counting semaphore value indicator of the semaphore responsive to receiving the indication to perform the increment operation; and
 a means for setting the value of the target wait count indicator of the semaphore to the target wait count value.

17. The distributed processor-based system of claim 12, further comprising:
 a means for receiving an indication to perform a decrement operation on the value of the counting semaphore value indicator of the semaphore, wherein the indication to perform the decrement operation comprises a target wait count value;
 a means for decrementing the counting semaphore value indicator of the semaphore responsive to receiving the indication to perform the decrement operation; and
 a means for setting the value of the target wait count indicator of the semaphore to the target wait count value.

18. A method for providing a self-resetting multi-producer multi-consumer semaphore, comprising:
 determining, by a synchronization management circuit of a distributed processor-based system comprising a plurality of processor devices, that a value of a current wait count indicator of the self-resetting multi-producer multi-consumer semaphore equals a value of a target wait count indicator of the semaphore; and responsive to determining that the value of the current wait count indicator of the semaphore equals the value of the target wait count indicator of the semaphore:
resetting a value of a counting semaphore value indicator of the semaphore to an initial semaphore value; and
resetting the value of the current wait count indicator to an initial wait value.

19. The method of claim 18, further comprising:
receiving an indication that a wait operation for the semaphore is completed; and
responsive to receiving the indication that the wait operation for the semaphore is completed, adjusting the value of the current wait count indicator of the semaphore towards the value of the target wait count indicator of the semaphore.

20. The method of claim 19, wherein:
the value of the target wait count indicator of the semaphore is a positive non-zero integer;
the initial wait value is zero (0); and
adjusting the value of the current wait count indicator of the semaphore towards the value of the target wait count indicator of the semaphore comprises incrementing the current wait count indicator of the semaphore.

21. The method of claim 19, wherein:
the value of the target wait count indicator of the semaphore is zero (0);
the initial wait value is a positive non-zero integer; and
adjusting the value of the current wait count indicator of the semaphore towards the value of the target wait count indicator of the semaphore comprises decrementing the current wait count indicator of the semaphore.

22. The method of claim 19, wherein the synchronization management circuit comprises a global synchronization management (GSM) circuit communicatively coupled to a plurality of local synchronization management (LSM) circuits of the distributed processor-based system.

23. The method of claim 22, further comprising providing, by an LSM circuit of the plurality of LSM circuits, the indication that the wait operation for the semaphore is completed to the GSM circuit.

24. The method of claim 22, further comprising, responsive to determining that the value of the current wait count indicator of the semaphore equals the value of the target wait count indicator of the semaphore, providing, by the GSM circuit, a reset indication to the plurality of LSM circuits.

25. The method of claim 18, further comprising:
receiving, by the synchronization management circuit, an indication to perform an increment operation on the value of the counting semaphore value indicator of the semaphore, wherein the indication to perform the increment operation comprises a target wait count value;
incrementing the counting semaphore value indicator of the semaphore responsive to receiving the indication to perform the increment operation; and
setting the value of the target wait count indicator of the semaphore to the target wait count value.

26. The method of claim 18, further comprising:
receiving, by the synchronization management circuit, an indication to perform a decrement operation on the value of the counting semaphore value indicator of the semaphore, wherein the indication to perform the decrement operation comprises a target wait count value;
decrementing the counting semaphore value indicator of the semaphore responsive to receiving the indication to perform the decrement operation; and
setting the value of the target wait count indicator of the semaphore to the target wait count value.

27. A computer program product stored on a non-transitory computer-readable storage medium and including instructions that, when executed by a synchronization management circuit of a processor device of a plurality of processor devices, cause the synchronization management circuit to:
determine that a value of a current wait count indicator of a self-resetting multi-producer multi-consumer semaphore equals a value of a target wait count indicator of the semaphore; and
responsive to determining that the value of the current wait count indicator of the semaphore equals the value of the target wait count indicator of the semaphore:
reset a value of a counting semaphore value indicator of the semaphore to an initial semaphore value; and
reset the value of the current wait count indicator to an initial wait value.

28. The computer program product of claim 27, wherein the instructions further cause the processor device to:
receive an indication that a wait operation for the semaphore is completed; and
responsive to receiving the indication that the wait operation for the semaphore is completed, increment the value of the current wait count indicator of the semaphore.

29. The computer program product of claim 27, wherein the instructions further cause the processor device to:
receive an indication to perform an increment operation on the value of the counting semaphore value indicator of the semaphore, wherein the indication to perform the increment operation comprises a target wait count value;
increment the counting semaphore value indicator of the semaphore responsive to receiving the indication to perform the increment operation; and
set the value of the target wait count indicator of the semaphore to the target wait count value.

30. The computer program product of claim 27, wherein the instructions further cause the processor device to:
receive an indication to perform a decrement operation on the value of the counting semaphore value indicator of the semaphore, wherein the indication to perform the decrement operation comprises a target wait count value;
decrement the counting semaphore value indicator of the semaphore responsive to receiving the indication to perform the decrement operation; and
set the value of the target wait count indicator of the semaphore to the target wait count value.

* * * * *